Figure 1:
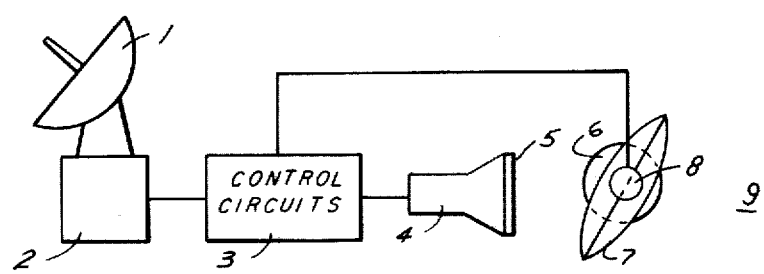

United States Patent [19]

Fajans

[11] 4,315,281
[45] Feb. 9, 1982

[54] THREE-DIMENSIONAL DISPLAY DEVICE

[76] Inventor: Jack Fajans, 1133 Magnolia Rd., Teaneck, N.J. 07666

[21] Appl. No.: 919,725

[22] Filed: Jun. 27, 1978

[51] Int. Cl.³ .......................... H04N 9/54; G01S 7/20
[52] U.S. Cl. .................................... 358/88; 343/7.9; 350/6.3; 350/130; 350/145; 352/86; 358/89
[58] Field of Search ................. 343/7.9; 358/89, 88; 350/130, 145, 6.3; 352/86

[56] References Cited

U.S. PATENT DOCUMENTS

| | | | |
|---|---|---|---|
| 2,648,061 | 8/1953 | Parker et al. | 343/7.9 |
| 2,837,735 | 6/1958 | Wolff | 358/89 |
| 3,140,415 | 7/1964 | Ketchpel | 343/7.9 |
| 3,682,553 | 8/1972 | Kapany | 343/7.9 |

*Primary Examiner*—S. C. Buczinski

[57] ABSTRACT

A luminous spot in a model area displays the position and movements of an object in space by means of apparatus which receives a location signal, such as a radar signal, indicative of the instantaneous coordinates of the object with respect to each of three axes of a system of coordinates in the space. The apparatus includes an oscilloscope and a thin, converging lens which is rotated about an axis parallel to the screen of the oscilloscope and perpendicular to the optical axis of the lens. A potentiometer coupled to the lens generates an angle signal indicative of the instantaneous angle defined by the optical axis and a line perpendicular to the oscilloscope screen. Control circuits connected to the source of the location signal cooperate with the oscilloscope to produce a visible, luminous signal in a point of the screen surface when the afore-mentioned instantaneous angle assumes a predetermined value. The position of the point relative to two intersecting axes in the screen surface is a function of the spacing of the axis of lens rotation from the screen surface and of the ratio of respective coordinates of the object with respect to the first and second axes in space. The position of the point relative to the other axis in the screen surface is a function of the spacing of the axis of rotation and of the ratio of the respective coordinates of the object from the second and third axes in space. The predetermined value of the instantaneous angle is a function of the spacing of the axis of lens rotation, the focal length of the lens, and the coordinates of the object with respect to two of the three axes in space.

5 Claims, 2 Drawing Figures

THREE-DIMENSIONAL DISPLAY DEVICE

This invention relates to a visible display of the location and movements of an object in space, preferably on a reduced scale, but in three dimensions, and particularly to a device for displaying the location of an object in space by a luminous spot.

It is common practice to track a flying object by means of radar, and the radar signal which indicates the instantaneous coordinates of the object with respect to three coordinates perpendicularly intersecting each other in space is converted to a visual display. There is no commercially available device which would indicate the position of the flying object in a model space in three dimensions so as to provide a direct, visible indication of the movements of the object in space.

The primary object of this invention is the provision of a device capable of duplicating the position and movements of an object in space by the location and movements of a light spot in a model space.

It has been found that such a light spot may be produced by a device in which an optical element having a fixed focal length and an optical axis is rotated about an axis of rotation transverse to the optical axis, spaced from a display surface and extending in a common direction with the display surface, when a visible luminous signal is generated in a point of the surface whenever the angle between the optical axis of the element and a line perpendicular to the display surface assumes a certain value, and the location of the point in the display surface is suitably coordinated with the location of the object in space.

More specifically, the device of the invention includes a source of a location signal, such as a radar signal, indicative of the instantaneous coordinates of the object with respect to each of three coordinates in space. An optical element having a fixed focal length and capable of projecting an image of a point in a display surface, such as the screen of an oscilloscope, is rotated about an axis of rotation spaced from the display surface, transverse to the optical axis of the element, and extending in a common direction with the display surface. An angle signal is generated as an indication of the instantaneous angle between the optical axis of the element and a line perpendicular to the display surface. A visible, luminous signal is generated in a point of the display surface when the instantaneous angle assumes a certain value. The position of the point in the display surface relative to one of two intersecting axes in the surface is a function of the spacing of the axis of rotation from the display surface and of the ratio of the respective coordinates of the object with respect to a first and a second axes of the three axes of a system of coordinates in space. The position of the point relative to the other axis in the display surface is a function of the same spacing and of a ratio of the respective coordinates of the object with respect to the second and third axes in space. The value of the instantaneous angle at the moment at which the luminous signal is generated is a function of the afore-mentioned spacing, of the focal length of the optical element, and of the coordinates of the object with respect to two of the three coordinates in space.

Figure 2:
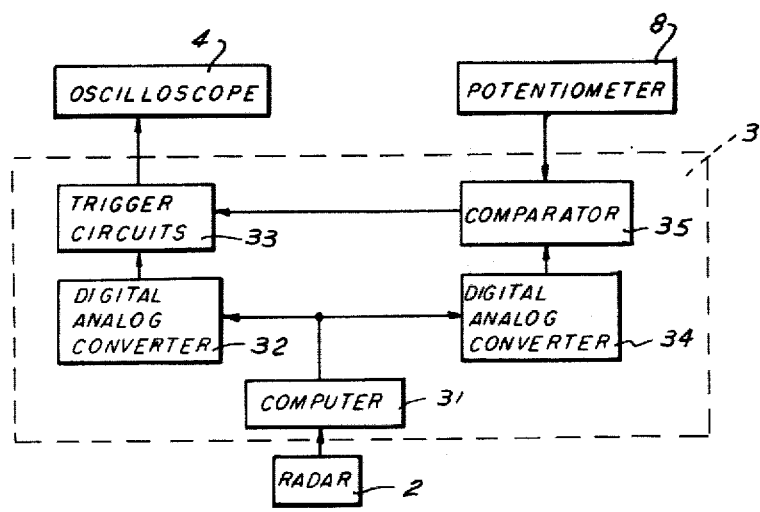

Other features, additional objects, and many of the attendant advantages of this invention will be appreciated more readily as the same becomes better understood from the following detailed description of a preferred embodiment when considered in connection with the appended drawing in which:

FIG. 1 illustrates essential elements of the device of the invention and associated structure by conventional symbols; and FIG. 2 is a block diagram of control circuits and of conductively connected other elements in the device of FIG. 1.

The arrangement illustrated in FIG. 1 includes a radar antenna 1 whose base 2 encloses conventional transmitting and receiving devices by means of which an electrical signal indicative of the location of an object tracked by the antenna 1 may be obtained with reference to a system of Cartesian coordinates suitably chosen for reference. The location signal is fed to control circuits 3 which control operation of a cathode ray tube 4 to produce luminous signals on the practically planar screen 5 of the tube 4.

A constant-speed electrical motor 6 rotates a simple, thin, symmetrical, biconvex lens 7 about an axis which is spacedly parallel to the screen 5 and perpendicular to the optical axis of the lens in the center of the lens. The motor 6 also rotates the movable contact of a potentiometer 8 conductively connected to the control circuits 3. Supporting structure, not shown, maintains a fixed spacing between the screen 5 and the axis of lens rotation.

As is shown in FIG. 2, the location signal obtained from the radar apparatus 2 is fed to a computer 31 which converts the radar signals indicative of the coordinates of the tracked object into control signals for the oscilloscope 4. After passing a digital-analog computer 32 and a trigger circuit 33, two of the control signals cause the cathode ray gun in the oscilloscope to be trained on a specific point of the screen 5. The computer also derives an angle reference signal from the radar signals and from the fixed spacing of the axis of lens rotation from the screen 5. This signal, after being passed through another digital-analog computer 34 is fed to a comparator circuit 35 which also receives the output of the potentiometer 8 and activates the trigger circuits 33 when the potentiometer 8 indicates identity of the reference angle with the angle defined by the optical axis of the lens 7 and a line perpendicular to the screen 5.

The activated trigger circuits 33 then control the beam intensity modulation of the oscilloscope to produce a luminous, visible spot on the screen 5 at a moment when the lens 7 is positioned to project an image of the spot in the model space 9 beyond the lens where it can be viewed by an observer. The potentiometer 8 is wound to produce two angle signals corresponding to the angle reference signal of the computer 31 during each revolution of the lens 7, and the motor 6 rotates the lens at a speed of 600 RPM. Successive images of respective luminous spots on the screen 5 merge into a continuous light signal which appears to the observer to stand still if the object tracked by the antenna 1 stands still, and moving when the tracked object moves.

The conversion of the radar signals and of the angle signals into angle reference signals and position signals for the spot on the screen 5 is achieved in a conventional manner, and the exact correlation of the input and output of the control circuits 3 depends on specific structural details of the device and on the results that it is intended to achieve.

The illustrated lens 7 is biconvex and symmetrical, and its thickness in the direction of the optical axis is small enough to be neglected. It is readily calculated under these conditions and a real, luminous image is projected in the model space 9 at a point defined by Cartesian coordinates X, Y, Z of the model space if the luminous spot on the screen 5 and the reference angle $\theta$ satisfy the following relationships:

$$y = -x_o \frac{Y}{X}$$

$$z = -x_o \frac{Z}{X}$$

$$\theta = \arccos\left[\frac{f(x_o + X)}{x_o\sqrt{X^2 + Z^2}}\right] - \arctan\left[-\frac{Z}{X}\right]$$

In these equations, $x_o$ is the spacing of the lens center or of the axis of lens rotation from the screen 5, X,Y,Z are the coordinates of the image in a system in which the X axis is perpendicular to the screen 5 through the axis of lens rotation, f is the fixed focal length of the lens 7, and y and z are the coordinates of the luminous spot on the screen 5 in a system whose x axis coincides with the X axis of the model space, the axes y and z being located in the screen surface.

Because of the symmetry of the optical system employed, X,Y,Z, in the above equations may be replaced by corresponding coordinates X',Y',Z' of the tracked object with respect to axes in the object space if the model space differs in scale only from the space in which the actual object is located. The radar signal, therefore, is indicative of X',Y',Z' which are respectively equal to nX,nY,nZ, and the above-relationships are valid for any display system meeting the conditions set forth above.

They need to be modified if the lens employed is not symmetrical, not bi-convex, of more than negligible thickness, or if the lens is replaced by another optical element, such as a mirror, and those skilled in the art will select a computer for producing the suitably modified relationship between the coordinates y,z, and the reference angle $\theta$ and the input signal indicating the location of a tracked object. The numerical relationships presented above also need to be modified if the coordinates of the projected image in the model space are not desired to differ from the coordinates of the tracked object by a constant proportionality factor. It may be desirable, for example, to exaggerate movement in the direction of one of the axes in the model space.

The invention has been described in its application to a problem in which its effectiveness is obvious, such as the tracking of an airplane and its visual representation to a flight controller. If two sets of location signals are produced by radar simultaneously tracking two aircraft and fed to control circuits 3 of the invention, the oscilloscope 4 may be triggered in two different angular positions of the lens 7 to produce two series of luminous spots on the screen 5 which appear to the viewer as two light images which move relative to each other in the model space 9 in three dimensions. In an actual embodiment of the invention, two such images are readily seen by a two-eyed observer to pass one behind the other.

However, the invention is not limited to the visualization of radar signals. It may be adapted in an obvious manner to the observation of objects not directly accessible to visual observation, but capable of furnishing location signals in three dimensions.

It should be understood, therefore, that the foregoing disclosure relates only to a presently preferred embodiment, and that it is intended to cover all changes and modifications of the example of the invention herein chosen for the purpose of the disclosure which do not constitute departures from the spirit and scope of the invention set forth in the appended claims.

What is claimed is:

1. A device for displaying the location of an object relative to three axis intersecting each other perpendicularly in a space, the device comprising:
    (a) a source of a location signal indicative of the instantaneous coordinates of said object with respect to each of said three axes in said space;
    (b) means defining a surface and two axes of a system of coordinates in said surface perpendicularly intersecting each other;
    (c) optical means for projecting an image of a point in said surface, said optical means having an optical axis and a focal length;
    (d) rotating means for rotating said optical means about an axis of rotation transverse to said optical axis and extending in a common direction with said surface, said axis of rotation being spaced from said surface;
    (e) first signal generating means for generating an angle signal indicative of the instantaneous angle defined by said optical axis and a line perpendicular to said surface; and
    (f) second signal generating means operatively connected to said source and to said first signal generating means for producing a visible, luminous signal in said point of said surface when said instantaneous angle assumes a predetermined value,
        (1) the position of said point relative to one of said axes in said surface being a function of the spacing of said axis of rotation from said surface and of the ratio of the respective coordinates of said object with respect to a first and a second one of said three axes in said space,
        (2) the position of said point relative to the other axis in said surface being a function of said spacing and of the ratio of the respective coordinates of said object with respect to the second and third axes in said space,
        (3) said predetermined value being a function of said spacing, of said focal length, and of coordinates of said object with respect to two of said three axes in said space.

2. A device as set forth in claim 1, wherein said optical means include a thin, coverging lens, said axis of rotation is perpendicular to said optical axis and parallel to said surface, said surface being planar.

3. A device as set forth in claim 2, wherein said position of said point relative to said one axis in said surface is proportional to the product of said spacing and of said ratio of said coordinates with respect to said first and second coordinates in said space, the position of said point relative to the other axis in said surface is proportional to the product of said spacing and of said ratio of said coordinates with respect to said second and third coordinates in said space.

4. A device as set forth in claim 3, wherein said predetermined value is proportional to an angle $\theta$, $\theta$ satisfying the relationship $$\theta = \arccos\left[\frac{f(x_o + X)}{x_o \sqrt{X^2 + Z^2}}\right] - \arctan\left[-\frac{Z}{X}\right]$$

in said relationship, x being said spacing, X and Z being respectively proportional to said coordinates of said object with respect to said two of three axes in said space, and f being said focal length.

5. A device as set forth in claim 1, wherein said focal length is fixed.

* * * * *